United States Patent
Ashdown

(10) Patent No.: US 7,388,665 B2
(45) Date of Patent: Jun. 17, 2008

(54) MULTICOLOUR CHROMATICITY SENSOR

(75) Inventor: Ian Ashdown, West Vancouver (CA)

(73) Assignee: TIR Technology LP, Burnaby (CA)

( * ) Notice: Subject to any disclaimer, the term of this patent is extended or adjusted under 35 U.S.C. 154(b) by 23 days.

(21) Appl. No.: 11/436,974

(22) Filed: May 19, 2006

(65) Prior Publication Data

US 2007/0051881 A1 Mar. 8, 2007

Related U.S. Application Data

(60) Provisional application No. 60/683,436, filed on May 20, 2005.

(51) Int. Cl.
*G01N 21/25* (2006.01)
*G01J 3/50* (2006.01)

(52) U.S. Cl. .................. 356/419; 356/420; 250/226

(58) Field of Classification Search ............... 356/419, 356/420; 250/226; 362/276
See application file for complete search history.

(56) References Cited

U.S. PATENT DOCUMENTS

| | | | |
|---|---|---|---|
| 3,987,298 A | 10/1976 | Rotolante | |
| 4,011,016 A | 3/1977 | Layne et al. | |
| 4,238,760 A | 12/1980 | Carr | |
| 4,308,456 A | 12/1981 | Van Der Gaag et al. | |
| 4,309,604 A | 1/1982 | Yoshikawa et al. | |
| 4,833,332 A | 5/1989 | Robertson, Jr. et al. | |
| 4,904,088 A | 2/1990 | Blazek et al. | |
| 6,127,783 A | 10/2000 | Pashley et al. | |
| 6,507,159 B2 * | 1/2003 | Muthu | 315/307 |
| 6,552,495 B1 * | 4/2003 | Chang | 315/169.3 |
| 6,727,521 B2 | 4/2004 | Merrill | |
| 6,753,994 B1 | 6/2004 | Russell | |

(Continued)

FOREIGN PATENT DOCUMENTS

WO 9836252 8/1998

(Continued)

OTHER PUBLICATIONS

Ashdown, Chromaticity and Color Temperature for Architectural Lighting, Proceedings of Solid State Lighting II, SPIE vol. 4776, pp. 51-60 (2002).

(Continued)

*Primary Examiner*—Roy M. Punnoose
(74) *Attorney, Agent, or Firm*—Mayer Brown LLP

(57) ABSTRACT

The present invention provides an optical sensor having one or more filter-photodetector pairs and feedback to monitor the intensity and chromaticity of the white light generated by an illumination system. According to the present invention, filter-photodetectors are configured into pairs thereof, wherein a first filter-photodetector of a pair is configured and arranged so as to be sensitive to a predetermined region of the electromagnetic spectrum, while a second filter-photodetector of the pair is configured and arranged to be sensitive to a substantially complementary region of the electromagnetic spectrum. The spectral responsivity of the first filter-photodetector and the second filter-photodetector overlap in a predetermined region of the electromagnetic spectrum. Furthermore, the spectral responsivity of the first filter-photodetector is configured to substantially monotonically increase with respect to wavelength within said predetermined region, while the spectral responsivity of the second filter-photodetector is configured to substantially monotonically decrease with respect to wavelength within said predetermined region.

16 Claims, 3 Drawing Sheets

U.S. PATENT DOCUMENTS

| | | | |
|---|---|---|---|
| 6,841,816 | B2 | 1/2005 | Merrill et al. |
| 6,864,557 | B2 | 3/2005 | Turner et al. |
| 6,894,442 | B1 * | 5/2005 | Lim et al. ............... 315/291 |
| 7,009,343 | B2 * | 3/2006 | Lim et al. ............... 315/150 |
| 7,026,769 | B2 * | 4/2006 | Lee et al. ............... 315/291 |
| 7,030,574 | B2 * | 4/2006 | Lim et al. ............... 315/312 |
| 7,140,752 | B2 * | 11/2006 | Ashdown ............... 362/276 |
| 7,212,287 | B2 * | 5/2007 | Jaffar et al. ............... 356/405 |
| 2004/0022282 | A1 | 2/2004 | Lano et al. |
| 2005/0062446 | A1 * | 3/2005 | Ashdown ............... 315/324 |

FOREIGN PATENT DOCUMENTS

WO    WO 2006122425 A1 * 11/2006

OTHER PUBLICATIONS

Ashdown, Neural Networks for LED Color Control, Proceedings of Solid State Lighting III, SPIE vol. 5187, pp. 215-226 (2003).

Bhalotra, Adaptive Optical Microspectrometers and Spectral-Selective Sensing. PhD thesis, Department of Applied Pysics, Stanford University (2004).

CIE Technical Report: Measurement of LEDS. CIE 127-2007. Vienna, Austria. International Commission on Illumination (2007).

CIE Technical Report: Colorimetry. CIE 15.3-2004. Vienna, Austria. International Commission on Illumination (2004).

Demarsh, TV Display Phosphors/Primaries - Some History, SMPTE Journal, vol. 102, pp. 1095-1098 (1993).

Deverse et al., Realization of the Hadamard Multiplex Advantage Using a Programmable Optical Mask in a Dispersive Flat-Field Near-Infrared Spectrometer, Applied Spectroscopy, vol. 54, No. 12, pp. 1751-1758 (2000).

Drew et al., Device-Independent Color via Spectral Sharpening, Proc. Second Color Imaging Conference: Color Science, Systems and Applications, IS&T/SID, pp. 121-126 (1994).

Drew et al., Spectral Sharpening with Positivity, Journal of the Optical Society of America, vol. 17, No. 8, pp. 1361-1370 (2000).

E.B.U. Stanford for Chromaticity Tolerances for Studio Monitors. Technical Publication 3212-E, European Broadcasting Unio, Geneva, Switzerland (1975).

Eppeldauer et al., Design and Characterization of a Photometer-Colorimeter Standard, Applied Optics, vol. 34, No. 13, pp. 2621-2631 (2004).

Folkerts, LED Backlighting Concepts with High Flux LEDs, SID 04 Digest, pp. 1226-1229 (2004).

Hamamatsu, Color Sensor Module C9303 - RGB-LED Backlight Monitor for TFT-LCD (Liquid Crystal Display). Hamamatsu, Japan. Hamamatsu Photonics K.K. (2004).

Harbers et al., LED Backlighting for LCD HDTV, Journal of the Society for Information Display, vol. 10, No. 4, pp. 347-350 (2002).

Haykin, Chapter 5. Radial-Basis Function Networks, Neural Networks: A Comprehensive Foundation, Prentice Hall, Second Edition (1999).

Hecht et al., Chapter 9, Interference, Optics, Reading, MA: Addison Wesley, Fourth Edition (2001).

Recommendation ITU-R BT. 709-5, Parameter values for the HDTV standards for production and international programme exchange, International Telecommunication Union, Geneva, Switzerland (1990).

Jenkins et al., Digital imaging colorimeter for fast measurement of chromaticity coordinate and luminance uniformity of displays, Flat Panel Display Technology and Display Metrology II, Proceedings of SPIE, vol. 4295, pp. 176-187 (2001).

Jiang et al., Factors Affecting Flourescent Backlight Operation, Proceedings of Nonimaging Optics: Maximum Efficiency Light Transfer III, SPIE vol. 2538, pp. 51-60 (1995).

Knipp et al., Thin Film Technology Based Micro-Fourier Spectrometer, Conference on MOEMS and Miniaturized Systems III, San Jose, CA (2003).

Knipp et al., Thin Film Color Sensors In Multi-Channel Technology, Proceedings of Sensors and Camera Systems for Scientific, Industrial and Digital Photography Applications II, Proceedings of SPIE vol. 4306, pp. 156-157 (2003).

Kohns et al., High-precision low-cost colorimeters and spectrophotometers based on liquid crystalline optics, XV Conference on Liquid Crystals, Proceedings of SPIE vol. 5565, pp. 332-337, (2004).

Kung et al., Standing-Wave Transform Spectrometer Based on Integrated MEMS Mirror and Thin-Film Photodetector, IEEE Journal on Selected Topics in Quantum Electronics, vol. 8, No. 1, pp. 98-105 (2002).

Leonardis et al., An Efficient MDL-Based Construction of RBF Networks, Neural Networks, vol. 11, pp. 963-973 (1998).

Lowe, Adaptive Radial Basis Function Nonlinearities and the Problem of Generalization, First IEEE International Conference on Artificial Networks, pp. 171-175 (1989).

Lu et al., Liquid-Crystal-Based Fourier Optical Spectrum Analyzer without Moving Parts, Japanese Journal of Applied Physics, vol. 44, No. 1A, pp. 291-293 (2005).

Lumileds: Light From Silicone Valley, Seattle Seminar Notes, Lumileds Lighting LLC, San Jose, CA (2002).

Lumileds, Luxeon Product Binning and Labelling, Technical Datasheet AB21, Lumileds Lighting LLC, San Jose, CA (2002).

Lumileds, Power Light Source Luxeon Emitter Data Sheet, Technical Datasheet DS25, Lumileds Lighting LLC, San Jose, CA (2003).

Magnusson et al., New Principles for Optical Filters, Applied Physics Letters, vol. 61, No. 9, pp. 1022-1024 (1992).

Man et al., Accurate Colorimetric Feedback for RGB LED Clusters, Proceedings of Solid State Lighting VI, SPIE vol. 6337 (2006).

Miller, Use of Tunable Liquid Crystal Filters to Link Radiometric and Photometric Standards, Metrologia, vol. 28, No. 3, pp. 145-149 (1991).

OCLI Products. SelectraBand Linear Variable Filters. Santa Rosa, CA: JDS Uniphase Corporation (2004).

Pacific Silicon Sensor Inc. Wavelength Sensor WS-7.56-TO5 Data Sheet. West Lake Village, CA. (1999).

Peng et al., Experimental Demonstration of Resonant Anomalies in Diffraction from Two-Dimensional Gratings, Optics Letter vol. 21, No. 8, pp. 549-551 (1996).

Perdujin et al., Light Output Feedback for RGB LED Backlight Applications, SID Symposium Digest of Technical Papers vol. 34, No. 1, pp. 1254-1257 (2003).

Robinson et al., Polychromatic Optical Feedback: Control, Stability, and Dimming, Proceedings of Solid State Lighting VI, SPIE vol. 6337 (2006).

Smpte, SMPTE C Color Monitor Colorimetry, SMPTE Recommend Practice 145-2004, Society of Motion Picture and Television Engineers, White Plains, NY (2004).

Sander et al., Microspectrometer with Slab-Waveguide Transmission Gratings, Applied Optics vol. 35, No. 21, pp. 4096-4101 (1996).

Sugiura et al., Wide Color Gamut Monitors - LED Backligting LCD and New Phosphor CRT, Proceedings of Liquid Crystal Materials, Devices and Applications X and Projection Displays X, SPIE-IS&T vol. 5289, pp. 151-160 (2004).

Sugiura., Six-primary-color LCD monitor using six-color LEDs with an accurate calibration system, Color Imaging XI: Processing, Hardcopy, and Applications, SPIE-IS&T vol. 6058, pp. 143-150 (2005).

TAOS TCS230 Programmable Color Light-to-Frequency Converter. Plano, TX: Texas Advanced Optoelectronic Solution Inc. (2004).

Vohsbeck-Petermann, Development and Construction of a Low-Cost Colorimeter, Proceedings of Imaging Science and Display Technologies, SPIE vol. 2949, pp. 99-101 (1997).

Wang et al., Surface Plasmon Tunable Filter and Spectrometer-on-a-Chip, Proceedings of Imaging Spectrometry III, SPIE vol. 3118, pp. 288-294 (1997).

Wyszecki et al., Colorimetry, Color Science, p. 118. (1982).

Yee et al., Miniature Spectrometers for Biochemical Analysis, Proceedings of Micro- and Nanofabricated Electro-Optical Mechanical Systems for Biomedical and Environmental Applications, SPIE vol. 2978, pp. 75-81 (1997).

Zavracky et al., A Micromachined Scanning Fabry-Perot Interferometer, Proceedings of Micromachined Devices and Components IV, SPIE vol. 3514, pp. 179-187 (1998).

Zukauskas et al., Introduction to Solid-State Lighting. New York, NY: Wiley-Interscience, pp. 78-82 (2002).

Introduction to Chromaticity Diagrams and Color Gamuts (http://www.cs.rit.edu/~ncs/color/t_chroma.html). (Apr. 14, 2005).

* cited by examiner

US 7,388,665 B2

MULTICOLOUR CHROMATICITY SENSOR

CROSS REFERENCE TO RELATED APPLICATION

This application claims the benefit of U.S. Provisional Patent Application No. 60/683,436, filed May 20, 2005, which is incorporated herein, in its entirety, by reference.

FIELD OF THE INVENTION

The present invention relates to optical sensing devices, and more particularly to multicolour chromaticity sensing devices for use with lighting devices.

BACKGROUND OF THE INVENTION

Light-emitting diodes (LEDs) are semiconductor devices that convert electrical energy directly into visible light of various colours. With the advent of high-flux LEDs, luminaires are progressively being moved from the traditional incandescent or fluorescent lamps to LEDs for increased reliability, higher luminous efficacy and lower maintenance costs. LED-based luminaires are increasingly becoming the architecture of choice in a variety of mainstream commercial applications such as accent lights, wall washing, signage, advertising, decorative and display lighting, facade lighting, and custom lighting, for example.

LEDs are also being used as energy-efficient and long-lived replacements for cold cathode fluorescent lamps (CCFLs) currently employed for backlighting of liquid crystal display (LCD) panels for televisions and computer monitors. Unlike CCFLs which have relatively broadband spectral power distributions, the narrow spectral bandwidths of red, green and blue LEDs can be suited for the corresponding colour filters of LCD panels.

While colour LEDs, for example red, green and blue LEDs, can be used to generate white light for use in LED-based luminaires and LCD panel backlighting, the white light's chromaticity is dependent on the combination of intensities and dominant wavelengths of the LEDs which are combined to produce white light. These optical parameters can vary even when the LED drive current is constant, due to such factors as heat sink thermal constants, changes in ambient temperature, and LED device aging.

One solution to this problem is to employ optical feedback to continuously measure the white light intensity and chromaticity and adjust the drive currents of the LEDs of various colours such that the intensity and chromaticity of the white light remains substantially constant. This solution requires a reliable and relatively inexpensive means of measuring both intensity and chromaticity.

One approach for measuring intensity and chromaticity relies on tristimulus colour sensors such as those manufactured by Hamamatsu™ and TAOS™. These tristimulus colour sensors typically comprise a colourimeter comprising three sensors (typically silicon photodiodes) whose spectral responsivities are modified by dyed colour filters to approximate the Commission Internationale de l'Eclairage™ (CIE) red ($\bar{x}$), green ($\bar{y}$), and blue ($\bar{z}$) colour matching functions of the human visual system, and wherein the combination of filters with photodetectors represent a tristimulus colour sensor. The colourimeter thereby determines the intensity and chromaticity of incident white light by measuring the sensor output with a suitable electrical device, for example a current meter. While it can be difficult and expensive to manufacture suitable filter-photodetector combinations to approximate the colour matching functions of the human visual system, tristimulus colour sensors may be used to directly measure white light intensity and chromaticity. For example, the $\bar{y}$ colour matching function is equivalent to the CIE $V(\lambda)$ spectral luminous efficiency function for photopic vision, and therefore represents luminous intensity.

In practice, however, the spectral responsivities of commercial tristimulus colour sensors such as those manufactured by Hamamatsu™ and TAOS™ can only roughly approximate the CIE colour matching functions. If the dominant wavelengths and spectral power distributions of the LEDs of various colours (such as red, green and blue) are fixed and roughly correspond to the peak wavelength responsivities of the tristimulus colour sensor, the three outputs of a tristimulus colour sensor can be used to measure the intensities of the various colours generated by the LEDs. On the basis of this information, the intensity and chromaticity of the resultant white light can be approximately calculated.

There are however three complicating factors. First, both the spectral power distributions of the colour LEDs and the spectral responsivities of the filter-photodetector combinations overlap, so there can be optical crosstalk between the three output channels of the tristimulus colour sensor. For example, the green channel of the tristimulus colour sensor will respond to radiant flux emitted by a blue or red LED.

Second, white light generated by red, green, blue, and amber LEDs is known to have better colour rendering properties than white light generated by red, green, and blue LEDs. The contribution of the amber light flux to the white light results in a composite spectral power distribution that more closely approximates that of a blackbody light source, which by definition has a CIE colour rendering index of 100. However, the red and green channels of the tristimulus colour sensor generally exhibit significant responses to the amber LEDs. The intensity of the amber LEDs therefore cannot be determined unless the intensities of light generated by the red and green LEDs and their contributions to the red and green channel outputs are known.

Third, even if the spectral power distributions of the colour LEDs and the spectral responsivities of the filter-photodetector combinations of the tristimulus colour sensor do not overlap, any change in the dominant wavelengths of the light produced by the LEDs can result in changes in the tristimulus sensor output. Even if the light-emitting sources are wavelength-tunable monochromatic lasers, the responsivities of the filter-photodetector combinations typically are not constant with respect to wavelength, and the tristimulus sensor output will therefore vary as each laser's wavelength is changed. This problem can be partially alleviated by using thin-film interference filters that have essentially constant bandpass characteristics within a specified range of wavelengths. When used with monochromatic LEDs, these filters can eliminate to some extent the optical crosstalk between channels of the tristimulus sensor. However, LEDs used in lighting applications typically have spectral full width half maximum values of between 15 and 35 nm, so optical crosstalk will typically occur unless the spectral power distribution of a colour LED is completely within the wavelength range of its corresponding colour filter. If the LEDs' spectral power distributions themselves overlap, for example as occurs with red and amber LEDs, optical crosstalk will be unavoidable with tristimulus colour sensors.

Another proposed approach is to use a spectroradiometer, wherein incident white light illuminates a slit and a diffractive element disperses the polychromatic light onto a linear sensor array whose photosensitive elements are sequentially measured by a measuring instrument such as a current meter. To be useful, the spectral resolution of the spectroradiometer must be better than the smallest acceptable change in dominant wavelength in order to avoid perceptible colour shifts in the white light. However, most spectroradiometer designs require precision optics and a considerable volume of space that is incompatible with microelectronic subsystems. Moreover, most of the existing spectroradiometer designs are typically difficult to fabricate, especially those based on micromachined moving parts.

Regardless of the spectroradiometer design, the sensor output typically comprises many different photodetector readings for each spectral wavelength range of 10 nm or less that are assembled into a relative spectral power distribution and then analyzed to determine the relative intensity and dominant wavelength of each LED. The processing power needed to perform this analysis generally requires a fast microprocessor, without which, the processing time may prevent the spectroradiometer from being used for real-time applications where the input signals change over a period of milliseconds.

What is clearly needed is a device with the simplicity and potential ease of manufacture of colourimetric sensors, but which does not suffer from the problem of varying output with changes in dominant wavelength. The spectroradiometer approach fails in that such devices are generally complex and expensive to manufacture, and they generate an overabundance of data that must be analyzed to obtain a few significant values, for example LED intensity and dominant wavelength.

U.S. Pat. No. 4,238,760 to Carr teaches a plurality of photodiodes that are constructed vertically on a common semiconductor substrate, whereby each photodetector exhibits spectral responsivity to different regions of the electromagnetic spectrum. The photodiode design disclosed by Carr has also been extended to implement tristrimulus photodiode arrays, such as those disclosed by Turner et al. in U.S. Pat. No. 6,864,557. A disadvantage of the photodiode design disclosed by Carr is that it can be difficult to obtain predetermined and desirable spectral responsivities solely through the use of semiconductor manufacturing techniques. For example, the photodiode design disclosed by Carr exhibits broad spectral responsivities for the blue and red photodiodes. As a result, the spectral resolution of Carr's photodiodes may be poor, particularly in the presence of electrical noise.

Therefore there is a need for a new multicolour chromaticity sensor that is relatively simple, while providing the desired level of detection.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a multicolour chromaticity sensor. In one aspect of the present invention there is provided a multicolour chromaticity sensor enabling determination of intensity and chromaticity of light, the sensor comprising: two or more photodetectors, each having a detection zone responsive to a range of wavelengths in the electromagnetic spectrum, wherein each photodetector generates a sensor parameter representative of intensity and chromaticity of light incident upon its detection zone; two or more filters, one filter optically coupled to a first of the two or more photodetectors thereby forming a first filter-photodetector and a second filter optically coupled to a second of the two or more photodetectors thereby forming a second filter-photodetector; and the first filter-photodetector configured to be sensitive to a first predetermined region of the electromagnetic spectrum, and the second filter-photodetector configured to be sensitive to a second predetermined region of the electromagnetic spectrum, said first filter-photodetector and second filter-photodetector forming a complementary pair, wherein the first predetermined region is complementary to the second predetermined region; wherein a measuring means interfaced with each of the two or more photodetectors independently receives a first sensor parameter from for one of the two or more photodetectors and a second sensor parameter for a second of the two or more photodetectors, thereby providing a means to determine the intensity and chromaticity of the light.

In another aspect of the present invention there is provided an illumination system comprising: a plurality of light-emitting elements for emitting different ranges of emission wavelengths of light; one or more sensors, each sensor including two or more photodetectors, each having a detection zone responsive to a range of wavelengths in the electromagnetic spectrum, wherein each photodetector generates a sensor parameter representative of intensity and chromaticity of light incident upon its detection zone, each sensor including two or more filters, one filter optically coupled to a first of the two or more photodetectors thereby forming a first filter-photodetector and a second filter optically coupled to a second of the two or more photodetectors thereby forming a second filter-photodetector; the first filter-photodetector configured to be sensitive to a first predetermined region of the electromagnetic spectrum, and the second filter-photodetector configured to be sensitive to a second predetermined region of the electromagnetic spectrum, wherein the first predetermined region is complementary to the second predetermined region, said first filter-photodetector and second filter-photodetector forming a complementary pair; measuring means interfaced with the one or more sensors for independently measuring sensor signals from each of the one or more sensors to enable determination of the intensity and chromaticity of the light; driver means coupled to the plurality of light-emitting elements and configured to generate a drive signal for each of the plurality of light-emitting elements; and control means coupled to the driver means and the measuring means, the control means for individually controlling the intensity of light emission of each of the plurality of light-emitting elements in response to the sensor signals.

DETAILED DESCRIPTION OF THE INVENTION

Definitions

Figure 1:
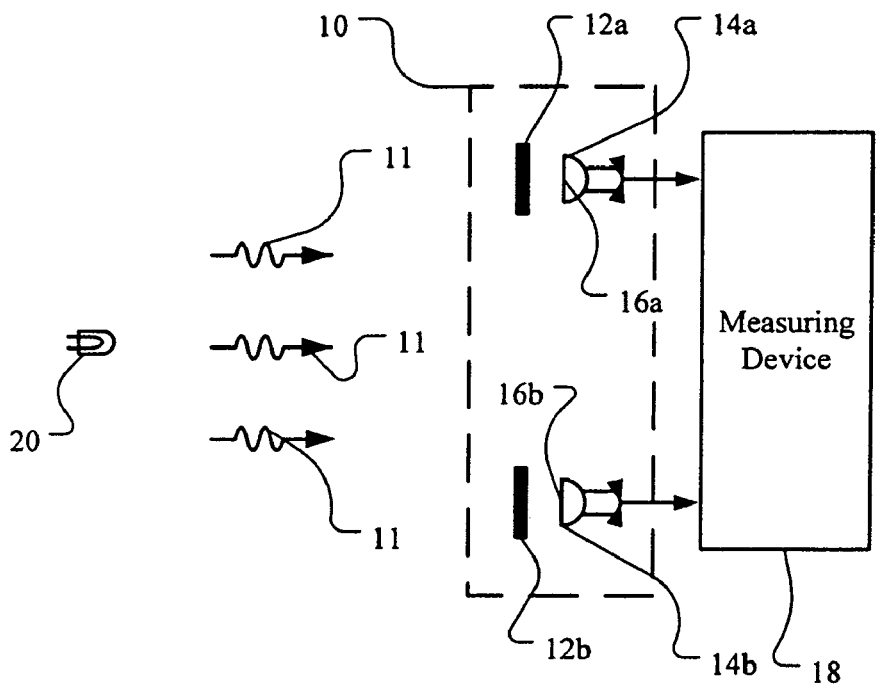
FIG. 1 is diagrammatic view of a multicolour chromaticity sensor according to an embodiment of the present invention.

The term "light-emitting element" is used to define any device that emits radiation in any region or combination of regions of the electromagnetic spectrum for example, the visible region, infrared and/or ultraviolet region, when activated by applying a potential difference across it or passing a current through it, for example. Therefore a light-emitting element can have monochromatic, quasi-monochromatic, polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or any other similar light-emitting devices as would be readily understood by a worker skilled in the art. Furthermore, the term light-emitting element is used to define the specific device that emits the radiation, for example a LED die, and can equally be used to define a combination of the specific device that emits the radiation together with a housing or package within which the specific device or devices are placed.

As used herein, the term "about" refers to a +/−10% variation from the nominal value. It is to be understood that such a variation is always included in any given value provided herein, whether or not it is specifically referred to.

The term "chromaticity" is used to define the perceived colour impression of light according to standards of the CIE.

The term "colour matching function" is used to define the spectral tristimulus values per unit wavelength and unit spectral radiant flux, according to the standards of the CIE.

The term "peak wavelength" is used to define the wavelength at which the spectral radiant flux per unit wavelength is maximal, according to the standards of the CIE.

The term "dominant wavelength" is used to define the wavelength of radiant flux of a single frequency that, when combined in suitable proportion with the radiant energy of a reference standard, matches the chromaticity of a perceived light source, according to the standards of the CIE.

The term "gamut" is used to define the plurality of chromaticity values that an illumination system is able to achieve.

The term "intensity" is used to define the luminous intensity of a light source according to standards of the CIE.

The term "sensor" is used to define an optical device having a measurable sensor parameter in response to a characteristic of incident light, such as its chromaticity or spectral intensity.

The term "spectral intensity" is used to define the spectral radiant intensity, according to the standards of the CIE.

The term "spectral power distribution" is used to define the spectral radiant flux per unit wavelength, according to the standards of the CIE, over a predefined range of wavelengths.

The term "spectral responsivity" is used to define the responsivity of a sensor per unit wavelength, over a predefined range of wavelengths.

The term "spectral transmittance" is used to define the ratio of transmitted radiant flux to incident radiant flux per unit wavelength, according to the standards of the CIE, over a predefined range of wavelengths.

The term "spectral resolution" is used to define the minimum separation between two different wavelengths in the optical spectrum as distinguishable by the sensor. This is quantified by separation $\Delta\lambda$, where $\lambda$ is the measurement wavelength.

Unless defined otherwise, all technical and scientific terms used herein have the same meaning as commonly understood by one of ordinary skill in the art to which this invention belongs.

The present invention arises from the realization that generation of white light with a substantially constant intensity and chromaticity by an illumination system including a combination of light-emitting elements of different colours is difficult to achieve due to the variations in the intensities and dominant wavelengths of the light-emitting elements. These variations are generally due to ambient temperature, age of the light-emitting elements, drive current, and various other physical conditions of the light-emitting elements.

The present invention provides an optical sensor having one or more filter-photodetector pairs and feedback to monitor the intensity and chromaticity of the white light generated by the illumination system and adjust the drive current to the light-emitting elements in order to maintain substantially constant intensity and chromaticity of the output white light irrespective of variations with respect to the light-emitting elements. According to the present invention, filter-photodetectors are configured into pairs thereof, wherein a first filter-photodetector of a pair is configured and arranged so as to be sensitive to a predetermined region of the electromagnetic spectrum, while a second filter-photodetector of the pair is configured and arranged to be sensitive to a substantially complementary region of the electromagnetic spectrum. The spectral responsivity of the first filter-photodetector and the second filter-photodetector overlap in a predetermined region of the electromagnetic spectrum. Furthermore, the spectral responsivity of the first filter-photodetector is configured to substantially monotonically increase with respect to wavelength within said predetermined region, while the spectral responsivity of the second filter-photodetector is configured to substantially monotonically decrease with respect to wavelength within said predetermined region.

Multicolour Chromaticity Sensor

Reference is now made to FIG. 1 which illustrates a multicolour chromaticity sensor according to an embodiment of the present invention. The sensor 10 includes colour filters 12a, 12b optically coupled to photodetectors 14a, 14b, each having a detection zone 16a, 16b for determining a sensor parameter in relation to the intensity and chromaticity of an incident light 11. The outputs of photodetectors 14a, 14b are interfaced to a measuring device 18 which independently evaluates the sensor parameters from the photodetectors 14a, 14b.

The colour filters 12a, 12b may be thin-film interference filters or transmissive dyed colour filters, wherein each filter provides a different band-pass spectral transmittance. Filters employing photonic crystals having resonance abnormalities or guided-mode resonance filters may also be used. Alternatively, tunable liquid crystal Lyot band pass filters, a single layer of liquid crystal material having a fairly wide bandpass spectral transmittance, plasmon filters or other types of optical filters as contemplated by those skilled in the art may also be employed.

The photodetectors 14a, 14b can be light-to-current converters comprising a photodiode and a current amplifier and these elements of the photodetectors may be configured for example on a single chip. However, the photodetectors 14a, 14b may comprise other similar light detection devices as is known to those skilled in the art, including but not limited to phototransistors, photoresistors, photovoltaic cells, phototubes, photomultiplier tubes or other formats of light-to-voltage converters or light-to-frequency converters. The photodetectors 14a, 14b may include lens elements (not shown) in front of the detection zones 16a, 16b thereof in order to enhance the amount of light that is absorbed by the detection zones 16a, 16b. The output of the photodetectors 14a, 14b is typically in the form of an electric signal proportional to the intensity of the light incident on the detection zones, 16a and 16b.

In one embodiment of the present invention, the first filter 12a and photodetector 14a of a pair and the second filter 12b and photodetector 14b of the pair can be mounted on a common substrate. Since the efficiency of the photodetectors 14a, 14b is dependent upon the operating temperature of the photodetectors 14a, 14b, both photodetectors 14a, 14b can be mounted on an isothermal region of the common substrate. Accordingly, while the absolute spectral responsivities of the photodetectors 14a, 14b may change with ambient temperature, their relative spectral responsivities can remain effectively unchanged.

As previously mentioned, in the presently described embodiment, the colour filters 12a, 12b are optically coupled to photodetectors 14a, 14b. In one embodiment, the first filter 12a and photodetector 14a of the pair can be sufficiently spaced from the second filter 12b and photodetector 14b of the pair to avoid optical cross-talk therebetween. In an alternate embodiment, the colour filters 12a, 12b could be in spaced relationship with the photodetectors 14a, 14b. The colour filters 12a, 12b and photodetectors 14a, 14b can be configured and arranged along an axis that is perpendicular or at an angle with respect to the axis of the incident light 11.

In the presently described embodiment, the first filter 12a and photodetector 14a of the pair is configured and arranged so as to be sensitive to a predetermined region of the electromagnetic spectrum, for example blue light, while the second filter 12b and photodetector 14b of the pair is configured and arranged to be sensitive to a substantially complementary region of the electromagnetic spectrum, such as red light. The spectral responsivity of the first filter 12a and photodetector 14a and the second filter 12b and photodetector 14b overlaps in a predetermined region of the electromagnetic spectrum, for instance in the green light region. Furthermore, the spectral responsivity of the first filter 12a and photodetector 14a substantially monotonically increases with respect to wavelength within said predetermined region, while the spectral responsivity of the second filter 12b and photodetector 14b substantially monotonically decreases with respect to wavelength within said predetermined region.

In one embodiment of the present invention, if the incident light 11 has a relative spectral power distribution $I(\lambda)$ and the spectral responsivities of the pair of first and second filters 12a, 12b and photodetectors 14a, 14b are respectively $R_a(\lambda)$ and $R_b(\lambda)$, the outputs of said filter-photodetector pairs are respectively $V_a = \int_\lambda I(\lambda) R_a(\lambda) d\lambda$ and $V_b = \int_\lambda I(\lambda) R_b(\lambda) d\lambda$. If the intensity I of the incident light 11 is varied while the relative spectral power distribution $I(\lambda)$ remains constant, the outputs of the pair of first and second filters 12a, 12b and photodetectors 14a, 14b and the quotient $V_a/V_b$ thereof also remain substantially constant. If, on the other hand, the relative spectral power distribution $I(\lambda)$ of the incident light 11 varies, the output of the pair of filter-photodetectors and the quotient thereof will also vary. If the change in the relative spectral power distribution $I(\lambda)$ is characterized by a shift in peak wavelength, simultaneous changes in intensity I and the relative spectral power distribution $I(\lambda)$ can be mathematically separable. This relationship between the intensity and relative spectral power distribution of the incident light and the outputs of the filter-photodetector pairs may therefore be used to calibrate and subsequently independently determine the intensity and chromaticity of white light generated by an illumination system comprising a plurality of light-emitting elements.

Figure 2:
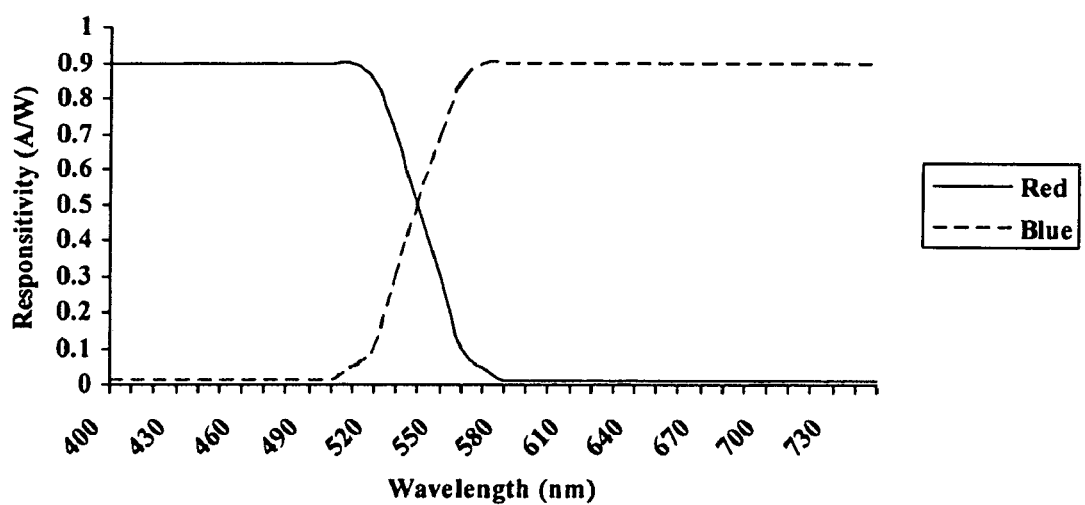
FIG. 2 is a graph illustrating the responsivities of the filter and photodetector pair of FIG. 1 over a portion of the electromagnetic spectrum.

FIG. 2 illustrates the spectral responsivity of the first filter 12a and photodetector 14a of the pair compared to the spectral responsivity of the second filter 12b and photodetector 14b of the pair according to one embodiment of the present invention. As can be readily observed, the effect of the pair of filters 12a, 12b and photodetectors 14a, 14b is that if the detected light exhibits a peak spectral intensity within the predetermined region, the combined outputs of the pair of filters 12a, 12b and photodetectors 14a, 14b will be substantially independent of the peak wavelength of the relative spectral power distribution. As an example, consider incident light 11 to be monochromatic radiation from a tunable-wavelength laser with an initial wavelength within said predetermined region of the spectrum. If the intensity I of the incident light 11 is increased or decreased, the outputs of filter-photodetector pair 12a, 14a and 12b, 14b will increase or decrease proportionately according to I=A+B, where A is the output of filter-photodetector pair 12a, 14a, and B is the output of filter-detector 12b, 14b.

In one embodiment of the present invention, if the peak wavelength of the relative spectral power distribution increases, the output of the first filter 12a and photodetector 14a will increase, while the output of the second filter 12b and photodetector 14b will decrease. As an example, if wavelength $\lambda$ of incident light 11 from a monochromatic light source is increased, the output of filter-photodetector 12a, 14a will decrease while the output of filter-photodetector 12b, 14b will increase. Conversely, if wavelength $\lambda$ of incident light 11 is decreased, the output of filter-photodetector 12a, 14a will increase while the output of filter-detector 12b, 14b will decrease. For example, assuming that wavelength $\lambda$ remains within the predetermined region of the spectrum, said wavelength will be proportional to $B+(1-A)/(A+B)$, relative to the minimum wavelength $\lambda_{min}$ of said predetermined region of the spectrum. Similarly, for example the wavelength can be proportional to quotient A/B, although in a typically less linear manner.

In one embodiment of the present invention, the sensor outputs can be measured by the measuring device 18, which can be a current meter combined with additional circuitry for conditioning of the signal from the current meter, as would be know to a worker skilled in the art. The measuring device 18 receives the respective outputs of the pair of filters 12a, 12b and photodetectors 14a, 14b and determines the relationships of the outputs.

For applications using for example substantially high-frequency pulse width or pulse code modulation for controlling the activation of the light-emitting elements, the intensity of the incident light 11 can vary rapidly, and therefore it may be necessary to measure the output of the pair of filters 12a, 12b and photodetectors 14a, 14b simultaneously with the activation of the light-emitting elements, in order to avoid discrepancies in the measured output due to the time-variations of incident light 11. Accordingly, the measuring device 18 can include additional circuitry (not shown) such as parallel flash analog-to-digital converters or sample-and-hold circuitry to simultaneously measure the output of the pair of filters 12a, 12b and photodetectors 14a, 14b with the activation of the light-emitting elements.

In one embodiment of the present invention, in operation the physical elements employed to implement the filters 12a, 12b and the photodetectors 14a, 14b may not exhibit perfect or near perfect behaviour. It therefore may be difficult to obtain constant slope attenuation with respect to wavelength for physically realizable spectral responsivities as illustrated in FIG. 2. As a result, the relationship between the intensity and chromaticity of incident light 11 and the outputs of the pair of filters 12a, 12b and photodetectors 14a, 14b may become nonlinear. In order to account for these possible nonlinearities associated with the physically realizable components for the pair of filters 12a, 12b and photodetectors 14a, 14b, in one embodiment of the present invention the outputs of the pair of filters 12a, 12b and photodetectors 14a, 14b can be compared with a lookup table containing optimal values and these outputs can be re-evaluated by analytic approximation in an attempt to linearize the spectral responsivities for the pair of filters 12a, 12b and photodetectors 14a, 14b. Similarly, where the incident light 11 has a variable spectral power distribution such as occurs when high-flux LEDs are used, for example when the spectral bandwidth and peak wavelength changes with increasing or decreasing drive current, changes in ambient temperature or peak wavelength variations due to colour binning of the LEDs during manufacture, experimental measurement or computer simulated measurements may be required to determine approximating analytic equation coefficients or numerical lookup tables as disclosed in for example co-pending U.S. patent application Ser. No. 10/897,990 "Control System for an Illumination Device Incorporating Discrete Light Sources", herein incorporated by reference.

As an example, a blue LED based on indium-gallium-nitride (InGaN) alloys may exhibit a peak wavelength shift as the drive current is reduced from full rated maximum current. For example, in co-pending U.S. Provisional Patent Application No. 60/772,458 "Light Source Intensity Control System and Method", herein incorporated by reference, a linear combination of two Gaussian functions with different centre wavelengths may be used to analytically model the LED spectral power distribution. This format of analytic model may be usefully employed rather than numerical lookup tables which may be memory-intensive.

As will be appreciated by those skilled in the art, the intensity and peak wavelength of a light source cannot be used to directly determine the chromaticity of the emitted light. However, for light sources such as LED-based illumination systems with red, green, and blue LEDs, the relative spectral power distribution comprises a plurality of peak wavelengths with relatively narrow spectral bandwidths. If changes in the intensity and peak wavelengths of each LED colour are measured with a complementary pair of filters and photodetectors, the corresponding change in the combined light intensity and chromaticity for the light source can be determined.

Figure 3:
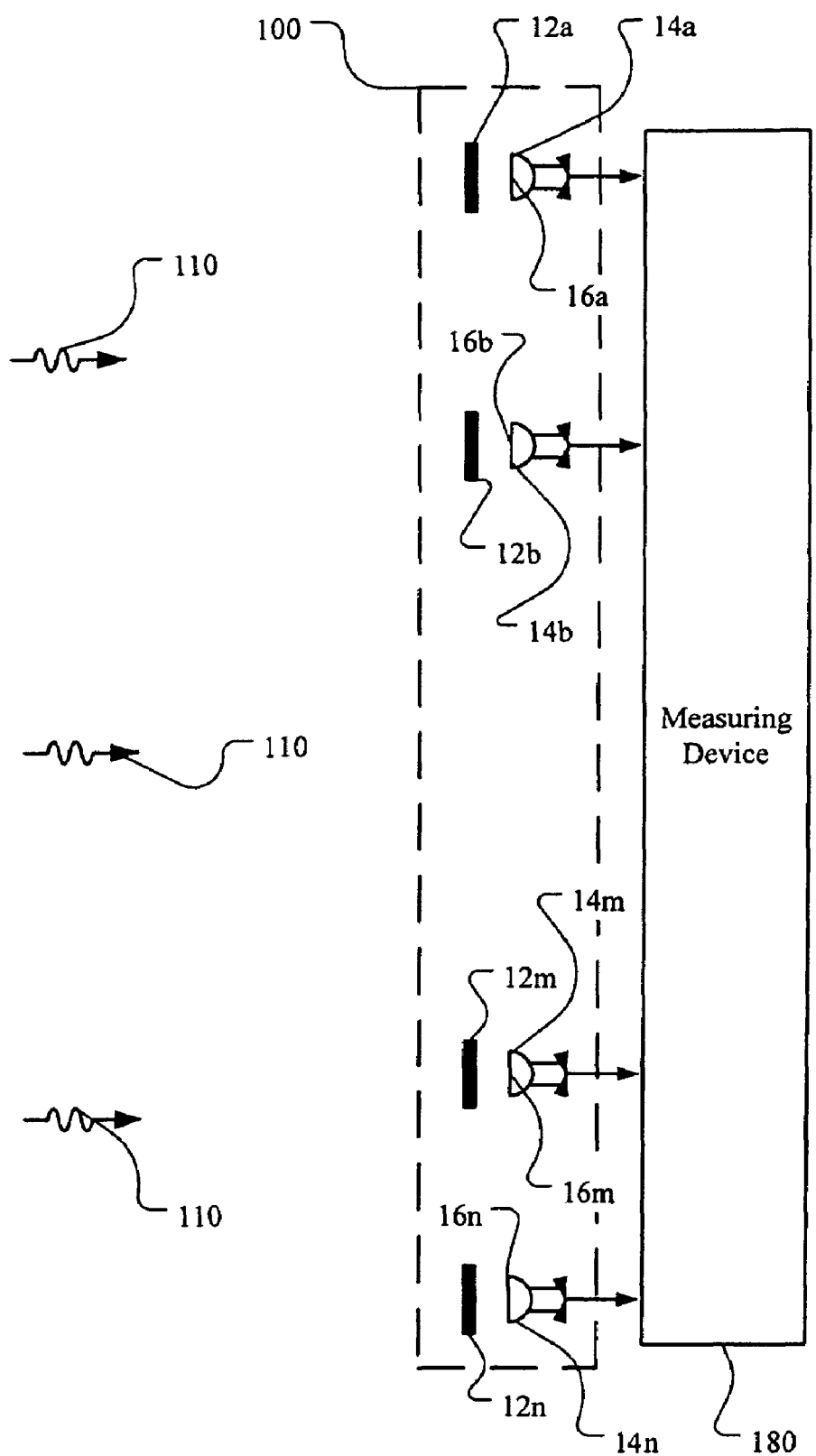
FIG. 3 is diagrammatic view of a multicolour chromaticity sensor having a plurality of filter-photodetector pairs according to another embodiment of the invention.

Referring to FIG. 3, a multicolour chromaticity sensor 100 in accordance with another embodiment of the present invention is illustrated. The sensor 100 includes a plurality of colour filters 12a . . . 12n optically coupled to photodetectors 14a . . . 14n, respectively, each having a detection zone 16a . . . 16n associated therewith for determining a sensor parameter in relation to the intensity and chromaticity of incident light 110. This incident light 110 has a gamut that is the combination of light of various wavelengths generated by the light-emitting elements (not shown), whereby each light-emitting element produces light having a specific range of wavelengths in the electromagnetic spectrum. In the diagrammatic representation of sensor 100 in FIG. 3, only the colour filters 12a, 12b, 12m and 12n, and photodetectors 14a, 14b, 14m and 14n, are shown. It would be readily understood that any number of filter-photodetector pairs can be used in the multicolour chromaticity sensor according to the present invention.

The first filter 12a and photodetector 14a form a complementary pair with the second filter 12b and photodetector 14b. In a similar fashion, the mth filter 12m and photodetector 14m form a complementary pair with the nth filter 12n and photodetector 14n. Each filter and photodetector of a pair is configured and arranged so as to be sensitive to a predetermined region of the electromagnetic spectrum, while the corresponding complementary the filter and photodetector of the pair is configured and arranged to be sensitive to a substantially complementary region of the electromagnetic spectrum. The spectral responsivities of the mth filter and photodetector and of its complementary filter and photodetector can overlap in a predetermined region of the electromagnetic spectrum. Moreover, the spectral responsitivity of the mth filter and photodetector substantially monotonically increases with respect to wavelength within said predetermined region, while the spectral responsivity of the complementary filter and photodetector substantially monotonically decreases with respect to wavelength within said predetermined region.

In one embodiment of the present invention, the outputs of photodetectors 14a . . . 14n are interfaced to a measuring device 180 which can independently evaluate the sensor parameters from the photodetectors 14a . . . 14n. The quotient of the output of the mth filter and photodetector of the pair divided by the output of the complementary filter and photodetector of the pair can be proportional to the peak wavelength. This quotient can be measured by the measuring device 180 and can serve to resolve the intensity and chromaticity of the incident light 110.

In one embodiment of the present invention and with reference to FIG. 3, for a given number n of light-emitting elements, the number of filters 12a . . . 12n and the number of photodetectors 14a . . . 14n required to implement the sensor 100 may be described by expression (1), as follows:

$$v(k)=2\times k$$

where: $v(k)$ is the number of filters 12a . . . 12n or the number of photodetectors 14a . . . 14n; and k is the number of light-emitting elements of different wavelength ranges.

Illumination System with Multicolour Chromaticity Sensor

Figure 4:
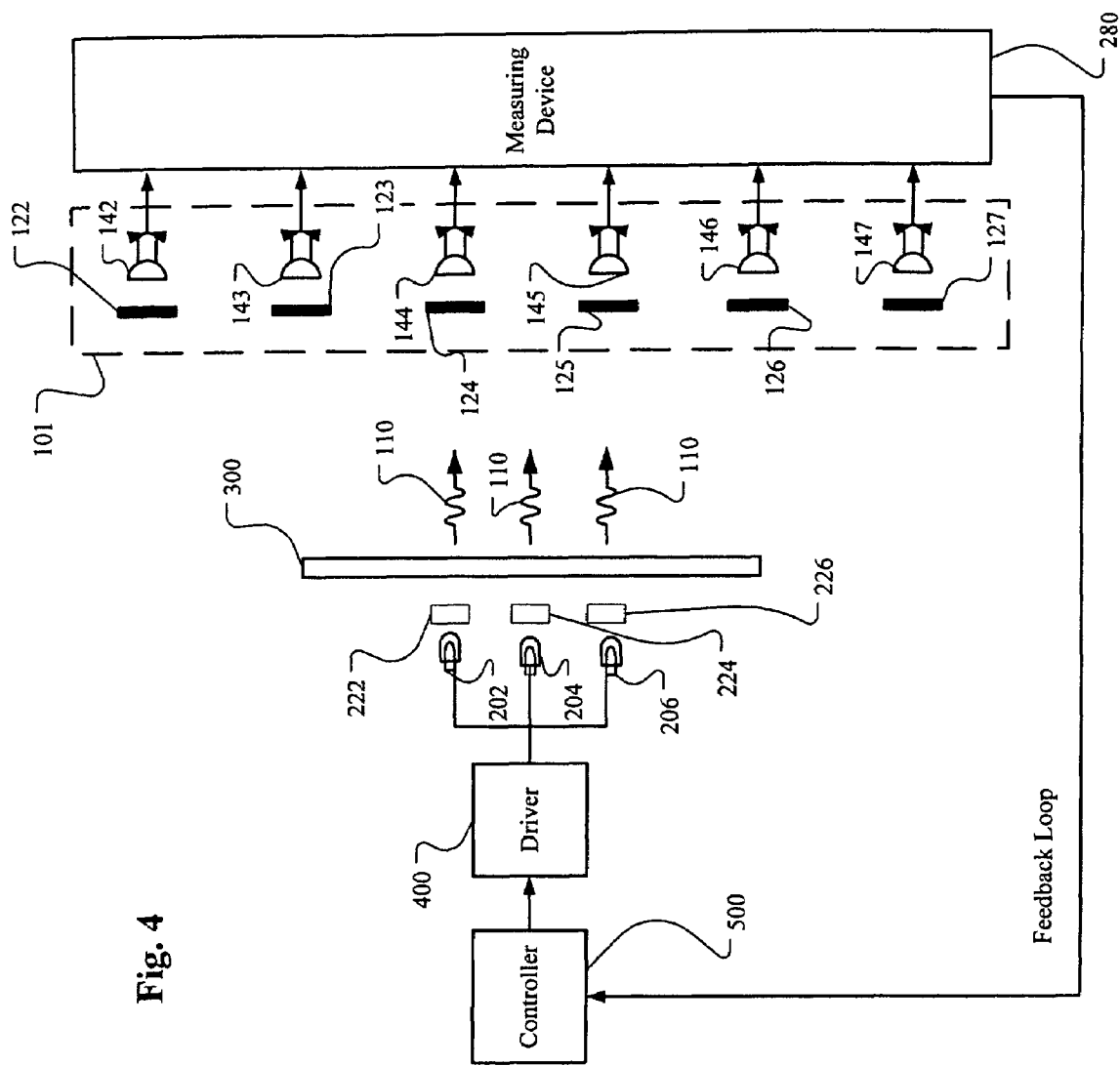
FIG. 4 is a diagrammatic view of an illumination system according to an embodiment of the present invention.

Reference is now made to FIG. 4, which shows an illumination system according to an embodiment of the present invention. The illumination system includes a plurality of light-emitting elements 202, 204 and 206 emitting electromagnetic radiation at different peak wavelengths. In the presently described embodiment of the invention, the light-emitting elements are LEDs, however other types of light-emitting elements as is known to those skilled in the art can also be used. The light-emitting elements 202, 204 and 206 are configured and arranged in a red array, a green array, and a blue array, respectively.

In one embodiment a condenser lens 222 or the like can be provided to enhance the optical output of the red array 202, for example. Like condenser lenses 224 and 226 or alternate optical elements can be provided for the blue and green arrays of light-emitting elements.

The light emitted from the red, green, and blue arrays, which can be emitted either sequentially or simultaneously, can provide a steady optical throughput of white light 110 composed of the combination of the red, green and blue light colours. In one embodiment, an optical diffuser 300 is provided to further spatially blend the constituent red, green and blue light colours, thereby improving the uniformity of the colour mixing and thereby generating white light 110 of a substantially uniform chromaticity.

With further reference to FIG. 4, the first filter 122 and photodetector 142 form a complementary pair with the second filter 123 and photodetector 143. In a similar fashion, third filter 124 and photodetector 144 form a complementary pair with the fourth filter 125 and photodetector 145, and the fifth filter 126 and photodetector 146 form a complementary pair with the 6th filter 127 and photodetector 147. Each of the filters 122, 124 and 126, and photodetectors 142, 144 and 146, respectively, is configured and arranged so as to be sensitive to a predetermined region of the electromagnetic spectrum, while their corresponding complementary filters 123, 125 and 127, and photodetectors 143, 145 and 147, are configured and arranged to be sensitive to a respectively substantially complementary region of the electromagnetic spectrum. As a result, the spectral responsivities of filters 122, 124 and 126, and photodetectors 142, 144 and 146 and their respective complementary filter 123, 125 and 127, and photodetector 143, 145 and 147 pairs overlap in a multiplicity of predetermined regions of the electromagnetic spectrum. In addition, the spectral responsivity of filters 122, 124 and 126, and photodetectors 142, 144 and 146 substantially monotonically increases with respect to wavelength within each said predetermined region, while the spectral responsivity of their respective complementary filter 123, 125 and 127, and photodetector 143, 145 and 147 substantially monotonically decreases with respect to wavelength within each said predetermined region, and wherein each said predetermined region includes the expected variation in peak wavelength of light-emitting elements 202, 204 and 206 respectively.

In one embodiment of the present invention, the outputs of photodetectors 142 to 147 are interfaced to the measuring device 280 which independently evaluates the sensor parameters from the photodetectors 142 to 147. The quotient of the output of filters 122, 124 and 126, and photodetectors 142, 144 and 146 divided by the output of their respective corresponding filter 123, 125 and 127, and photodetector 143, 145 and 147 can be proportional to the peak wavelength of the red, green and blue lights, respectively. Each quotient can be measured by the measuring device 280 and can serve to resolve the intensity and chromaticity of the incident light 110.

In one embodiment of the present invention, a driver circuit 400 module coupled to the light-emitting elements 202, 204 and 206 can be configured to generate a drive signal for independently driving the light-emitting elements 202, 204 and 206. A controller 500 can communicate with the driver circuit 400. The controller 500 can be implemented by a microprocessor or the like and can control the amount of current supplied to each light-emitting elements 202, 204 and 206. In one embodiment of the present invention the control of the current supplied to the light-emitting elements can be performed using pulse width modulation, pulse code modulation or other method as would be readily understood by a worker skilled in the art.

In one embodiment of the present invention, the controller 500 can interface with the measuring device 280 in a feedback loop configuration. The feedback loop configuration can allow the controller 500 to constantly monitor the intensity and chromaticity of the incident light 110 based on the sensor parameters determined by the measuring device 280, and determine the amount of current to be supplied to each of the light-emitting elements 202, 204 and 206 in order to maintain constant intensity and chromaticity of the generated incident light 110.

It is obvious that the foregoing embodiments of the invention are exemplary and can be varied in many ways. Such present or future variations are not to be regarded as a departure from the spirit and scope of the invention, and all such modifications as would be obvious to one skilled in the art are intended to be included within the scope of the following claims.

What is claimed is:

1. A multicolour chromaticity sensor enabling determination of intensity and chromaticity of light, the sensor comprising:
   a) two or more photodetectors, each having a detection zone responsive to a range of wavelengths in the electromagnetic spectrum, wherein each photodetector generates a sensor parameter representative of intensity and chromaticity of light incident upon its detection zone;
   b) two or more filters, one filter optically coupled to a first of the two or more photodetectors thereby forming a first filter-photodetector and a second filter optically coupled to a second of the two or more photodetectors thereby forming a second filter-photodetector; and
   c) the first filter-photodetector configured to be sensitive to a first predetermined region of the electromagnetic spectrum, and the second filter-photodetector configured to be sensitive to a second predetermined region of the electromagnetic spectrum, said first filter-photodetector and second filter-photodetector forming a complementary pair, wherein the first predetermined region is complementary to the second predetermined region;
   wherein a measuring means interfaced with each of the two or more photodetectors independently receives a first sensor parameter from for one of the two or more photodetectors and a second sensor parameter for a second of the two or more photodetectors, thereby providing a means to determine the intensity and chromaticity of the light.

2. The sensor according to claim 1, wherein the first predetermined region and the second predetermined region are configured to overlap in a defined zone of the electromagnetic spectrum.

3. The sensor according to claim 2, wherein spectral responsivity of the first filter-photodetector monotonically increases with respect to wavelength within the defined zone and spectral responsivity of the second filter-photodetector monotonically decreases with respect to wavelength within the defined zone.

4. The sensor according to claim 1, wherein the two or more filters are selected from the group comprising thin-film interference filters, transmissive dyed colour filters, filters having photonic crystals with resonance abnormalities, guided-mode resonance filters, tunable liquid crystal Lyot band pass filters and plasmon filters.

5. The sensor according to claim 1, wherein the two or more photodetectors are selected from the group comprising phototransistors, photoresistors, photovoltaic cells, phototubes, photomultiplier tubes, light-to-voltage converters and light-to-frequency converters.

6. The sensor according to claim 1, wherein the first filter-photodetector and second filter-photodetector are mounted on a common substrate.

7. An illumination system comprising:
   a) a plurality of light-emitting elements for emitting different ranges of emission wavelengths of light;
   b) one or more sensors, each sensor including two or more photodetectors, each having a detection zone responsive to a range of wavelengths in the electromagnetic spectrum, wherein each photodetector generates a sensor parameter representative of intensity and chromaticity of light incident upon its detection zone, each sensor including two or more filters, one filter optically coupled to a first of the two or more photodetectors thereby forming a first filter-photodetector and a second filter optically coupled to a second of the two or more photodetectors thereby forming a second filter-photodetector; the first filter-photodetector configured to be sensitive to a first predetermined region of the electromagnetic spectrum, and the second filter-photodetector configured to be sensitive to a second predetermined region of the electromagnetic spectrum, wherein the first predetermined region is complementary to the second predetermined region, said first filter-photodetector and second filter-photodetector forming a complementary pair;

c) measuring means interfaced with the one or more sensors for independently measuring sensor signals from each of the one or more sensors to enable determination of the intensity and chromaticity of the light;

d) driver means coupled to the plurality of light-emitting elements and configured to generate a drive signal for each of the plurality of light-emitting elements; and e) control means coupled to the driver means and the measuring means, the control means for individually controlling the intensity of light emission of each of the plurality of light-emitting elements in response to the sensor signals.

8. The illumination system according to claim 7, wherein the first predetermined region and the second predetermined region are configured to overlap in a defined zone of the electromagnetic spectrum.

9. The illumination system according to claim 8, wherein spectral responsivity of the first filter-photodetector monotonically increases with respect to wavelength within the defined zone and spectral responsivity of the second filter-photodetector monotonically decreases with respect to wavelength within the defined zone.

10. The illumination system according to claim 7, wherein the control means is configured to use pulse width modulation or pulse code modulation for controlling activation of the plurality of light-emitting elements.

11. The illumination system according to claim 10, wherein the measuring means is configured to measure the sensor signals simultaneously with the activation of the plurality of light-emitting elements.

12. The illumination system according to claim 7, wherein the control means is configured to compare the sensor signals with optimal sensor signal values, thereby providing a means for determination of adjusted spectral responsivities of the first filter-photodetector and the second filter-photodetector.

13. The illumination system according to claim 12, wherein the control means comprises memory for storing the optimal values in a look-up table.

14. The illumination system according to claim 12, wherein the control means comprises memory for storing an analytic equation for calculation of the optimal values.

15. The illumination system according to claim 7, further comprising one or more condenser lenses for manipulating the light emitted by one or more of the plurality of light-emitting elements.

16. The illumination system according to claim 7, further comprising a diffuser for blending the light emitted by the plurality of light-emitting elements.

* * * * *